Sept. 10, 1935.  R. BOREL  2,013,846
INFLATER CONNECTER
Filed Sept. 20, 1933
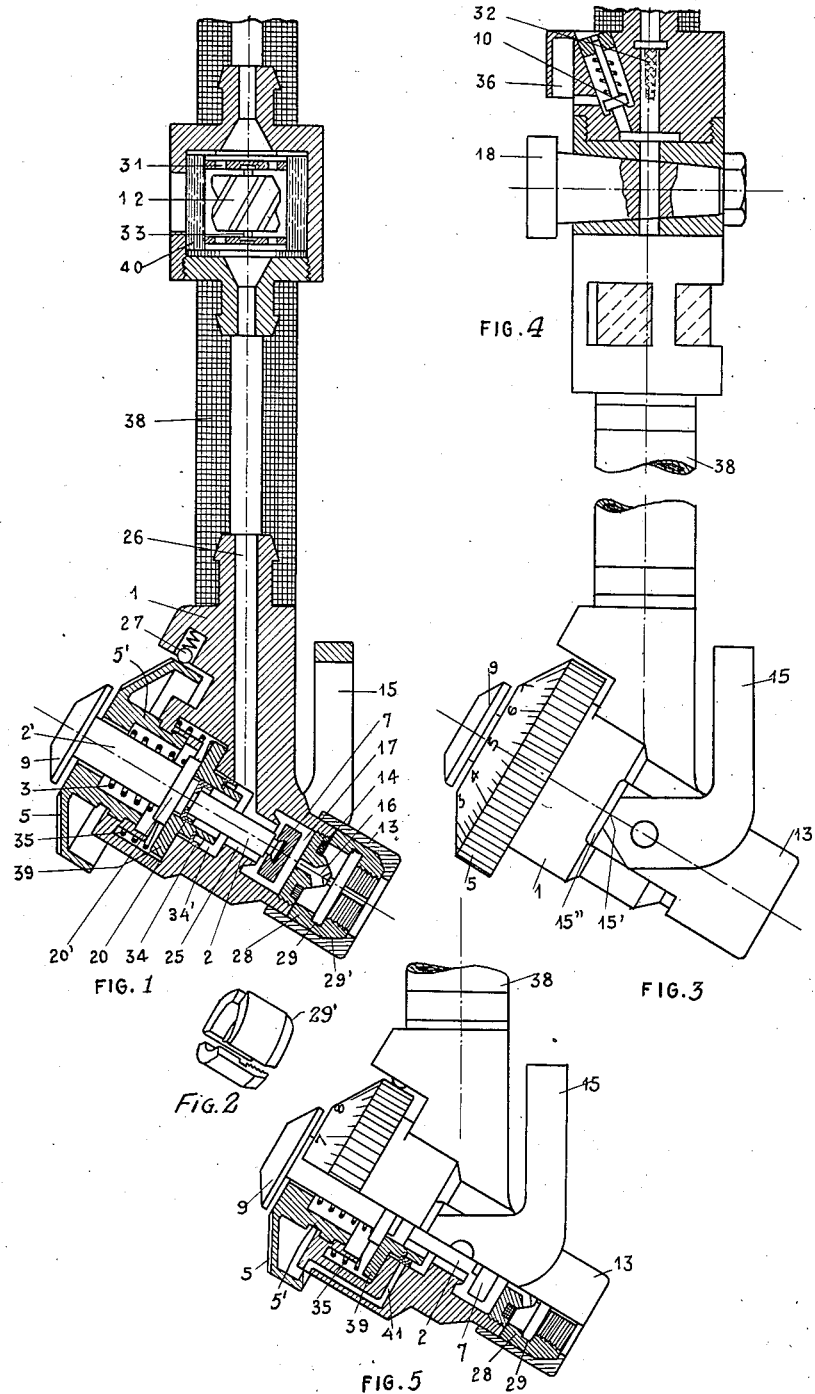
Inventor:
Roger Borel
per Fred F. Barlow
Attorney.

Patented Sept. 10, 1935

2,013,846

UNITED STATES PATENT OFFICE 2,013,846

INFLATER CONNECTER

Roger Borel, Paris, France, assignor to Societe Anonyme Edouard Dubied & Compagnie, Neuchatel, Switzerland Application September 20, 1933, Serial No. 690,239
In France September 29, 1932

1 Claim. (Cl. 152—11.5)

The present invention relates to a self-contained connecter serving for the automatic inflation of pneumatic tyres of automobiles to a predetermined pressure which is fixed in advance, the arrangement being particularly adapted to be used in conjunction with the ordinary compressors commonly employed in garages.

The automatic connecter-distributor according to the invention is shown in certain forms on the accompanying drawing, according to which:—

Fig. 1 is an axial section of an embodiment of the invention.

Fig. 2 is a detail view in perspective of the three sector-shaped elements used for engaging the tyre stem.

Fig. 3 is a partial elevation of the device shown in Fig. 1.

Fig. 4 is a part sectional, part elevational view showing certain parts which can be used in addition if required, and Fig. 5 is a part sectional view of the connecter according to Figs. 1 and 3 with which is incorporated an acoustic signalling device.

In accordance with the embodiment shown in the drawing, the connecter comprises a body 1 provided with an inlet passage 26 to which a flexible pipe 38 is attached. The passage 26 opens into a chamber 25 the axis of which is oblique to that of the passage 26. Said body is provided with tyre-engaging means comprising a sleeve 13 slidably mounted on said body and enclosing three sectors 28 (see Fig. 2) in which a spring 29 is arranged tending constantly to urge said sectors outwardly. Said sectors embody a threaded interior to engage the tyre valve stem. A lever 15 is pivoted to the body 1 and a part 15' of said lever is adapted to co-operate with projections 15'' on lateral extensions of sleeve 13.

These sectors are provided exteriorly with a conical part 29' and the inside of sleeve 13 is correspondingly shaped so that the threaded interiors of sectors 28 are applied tightly against the outside of the tyre valve casing or stem when the lever 15 is moved so that the portion 15' thereof engages the projection 15'' to cause the sleeve 13 to be moved towards the body 1.

A rubber ring 14 serves as a fluid-tight packing for engaging the tip of the valve stem against which the connecter is applied. Finally, a pin 16 depresses the tyre valve stem.

In the chamber 25 there is movably mounted a piston rod 2 integral with an end piece 2' and embodying a collar 20'. A cylinder 39 is itself slidably mounted in a chamber 34' in body 1, being subjected to the action of a spring 35. A cup leather 20 on rod 2 bears against the inside of cylinder 39 while the latter also embodies a cup leather 34 bearing against a bore in the body of the connecter. The piston rod 2 also carries a metallic closure element 7 which is mounted on a universal joint so as to be movable in all directions within certain limits, said element seating against an orifice of chamber 25.

The air leaving the chamber 25 passes into a circular space 17 enclosing valve 7 and through the sleeve 13 to enter the tyre valve and thence to pass into the pneumatic tyre to be inflated.

The piston rod 2 and its end piece 2' is subjected to the action of a regulating spring 3 bearing against collar 20' and compressed by means of a nut 5' to which is fastened a knurled disc 5 the upper face of which is graduated so that it can be set in relation to an index mark on the body 1, whereby the compression of the spring 3 can be regulated in advance to correspond to the pressure which it is desired to obtain in the tube. The end part 2' of the piston rod 2 is terminated by an enlarged knob 9 whereby the valve can be opened by pressing thereon with the thumb.

The knurled disc 5 embodying the scale is damped as regards rotary movement by a ball brake 27 which prevents any accidental movement in course of manipulation of the device.

The cylinder 39 functions as a sliding cylinder for the piston rod 2 and for its cup leather 20 but said cylinder is also adapted itself to function as a piston in the chamber 34'. The spring 35 is regulated once and for all to correspond to the maximum pressure of operation of the compressor.

The assembly is completed by a rotatable turbine wheel 12 located in a glass tube 40 or by a whistle 36, Fig. 4. A flexible pipe 38 connects the body 1 of the device to the turbine wheel 12 which permits the apparatus to be worked with one hand while making it possible to watch the turbine wheel. This latter continues to rotate as long as it is traversed by the air flowing from the source and passing the fixed members of the stator 31.

The turbine wheel 12 rests in two jewelled bearings by means of pivots 33, which ensures that the assembly has the maximum sensitivity to rotation.

The members shown on Fig. 4 may also be added to the assembly described. As shown in this figure, one or more safety valves 10 are provided for ensuring the safety of the air source. In addition, a filter 32 is provided, as well as a valve, for example of the plug type 18, permitting the source of air to be isolated and which may be used for example in the case where this comprises, for example, a container or reservoir for compressed air. These various associated members are independent of one another and can consequently be each or all added to the apparatus or not, as desired.

The arrangement of the device permits it to be used as an ordinary connecter by opening the valve element 7 positively by screwing the knurled disc 5 home so that the spring 3 is fully compressed, thereby preventing the closure of the valve against its seat whatever the pressure, and, on the contrary, if the scale disc 5 is turned to 0, the device may be used as a non-return valve for the inflowing air.

In addition, depression of the knob 9 permits the closure element 7 to be maintained fully open at will with the thumb and thus the device can be used as an inflating pistol where it is desired to work in this way.

The operation of the device is as follows: After it has been connected to any source of air, the scale disc 5 is set to the pressure which it is desired to obtain in the tube, by moving the said disc so that the desired indication is given thereon opposite the fixed index on the body. This operation results in opening the closure element 7 and maintaining it open under an initial tension which corresponds to the pressure to be obtained in the tube. Then the sleeve 13 is fixed to the valve of the tyre by raising the lever 15, which results in opening the mechanism of the valve by means of the pin member 16.

If the assembly embodies a valve 18, the latter is then opened and the compressed air coming from the source passes the turbine wheel 12 and sets it into movement to permit the effective passage of the air to be verified. Then the air passes successively through the passage 26, the chamber 34′, the chamber 25, the chamber 17 and the pin 16 so as finally to enter the tube through the tyre valve mechanism of which the valve stem is depressed by the pin 16.

The pressure increases progressively in the tube and in the apparatus. By reason of the angular arrangement of the air inlet and the enlarged head of the closure element 7 which acts as a deflector, this element is held open for the greater part of the inflation time, which ensures that the inflation is effected with exceptional rapidity. When the pressure in the tube reaches the value fixed in advance by the regulation of the compression of the spring 3, the closure element 7 after having passed for an instant through a position of equilibrium, is applied suddenly against its seat, which produces automatically the stoppage of the inflation. At this instant the pressure is practically the same on the two faces of the closure element 7 and the latter is only applied lightly against its seat. The metal-to-metal contact, which ensures a great precision in the working of the apparatus, must now be made sufficiently secure for fluid-tightness to be ensured in an absolute manner.

It is for this purpose that the invention provides for the positive application of the closure element 7 against its seat by bringing into action an auxiliary force obtained in the following way:

As the air circuit is broken at the moment when the valve is applied against its seat, the pressure increases in front of this valve until that corresponding to the compression of the auxiliary spring 35 is reached, which gives way under the effort exerted thereon by the cylinder 39 controlled by this excess air pressure acting on its lower part and particularly on the cup leather 34. This cylinder, by reason of the collar 20′, engages the piston rod 2 in its upward movement and by this fact and the fact that the diameter of 34′ is greater than 25, the metallic closure element 7 is applied against its seat with such a force that absolute fluid-tightness is ensured.

When the valve is closed and the inflation is consequently stopped, the rotatable turbine wheel 12 also stops, indicating to the observer that the operation is finished. If an operator is not present, the inflation is stopped at the desired pressure since as soon as the valve is closed, no more compressed air passes to the tube from the source.

If the apparatus embodies a whistle instead of a turbine wheel, this whistle may be placed directly after the safety valve so as to come into action when the latter opens at the end of the inflation.

Various alterations may be made in the constructive details of the present invention within the scope of the appended claim. Thus, for example, the movement of the cylinder 39 may be utilized to uncover a passage 41 (Fig. 5) opening towards the outside, in such a way that the cylinder acts itself as a safety valve and by causing the air which escapes from this passage to impinge on the edge of the regulating disc 5, it is also possible to produce an alternative arrangement of the warning whistle.

What I claim and desire to secure by Letters Patent of the United States of America is:—

A pressure regulating cut off comprising a balancing piston rod, a closure element mounted on one end of said piston rod by means of a universal joint, a collar on said piston rod, a spring bearing against said collar, means for adjusting the compression of said spring, a piston member surrounding said piston rod and movable axially in relation thereto, said piston bearing against the opposite side of said collar to that co-operating with the spring, a housing within which said piston is slidably accommodated in an air-tight manner, said housing being provided with an air inlet passage arranged obliquely to the piston rod, a seat to co-operate with said closure element, a spring acting against said piston and an external operating knob on said piston rod.

ROGER BOREL.